(12) United States Patent
Marsden et al.

(10) Patent No.: US 8,031,363 B2
(45) Date of Patent: Oct. 4, 2011

(54) METHODS AND APPARATUS FOR DYNAMICALLY SOFT PROOFING HALFTONE IMAGES

(75) Inventors: Jonathan Marsden, San Mateo, CA (US); Richard A. Falk, San Rafael, CA (US); David Macy, Pacifica, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 1209 days.

(21) Appl. No.: 10/404,972

(22) Filed: Mar. 31, 2003

(65) Prior Publication Data

US 2004/0190018 A1    Sep. 30, 2004

(51) Int. Cl.
*H04N 1/52* (2006.01)
*H04N 1/46* (2006.01)

(52) U.S. Cl. ......... 358/1.9; 358/536; 358/533; 358/450; 358/538; 358/534; 347/43; 345/589; 345/590

(58) Field of Classification Search .............. 358/1.9, 358/536, 533, 450, 538, 534; 347/43
See application file for complete search history.

(56) References Cited

U.S. PATENT DOCUMENTS

| | | | |
|---|---|---|---|
| 4,149,194 A | | 4/1979 | Holladay |
| 4,924,301 A | | 5/1990 | Surbrook |
| 5,029,107 A | * | 7/1991 | Lee ............................... 345/698 |
| 5,309,246 A | * | 5/1994 | Barry et al. .................... 358/1.9 |
| 5,497,248 A | * | 3/1996 | Kirk et al. .................... 358/3.06 |
| 2002/0008880 A1 | * | 1/2002 | Dewitte et al. ................. 358/1.9 |
| 2002/0036783 A1 | | 3/2002 | Yoshidome |
| 2002/0196310 A1 | * | 12/2002 | Inoue ............................. 347/43 |
| 2003/0035145 A1 | | 2/2003 | Wang |
| 2003/0147108 A1 | * | 8/2003 | Gonzalez et al. ............. 358/504 |
| 2005/0097458 A1 | * | 5/2005 | Wilson .......................... 715/517 |

FOREIGN PATENT DOCUMENTS

| | | |
|---|---|---|
| EP | 0 620 674 A1 | 10/1994 |
| EP | 04758481.8 | 3/2006 |
| WO | WO 02/080523 A2 | 10/2002 |
| WO | PCT/US2004/009472 | 11/2004 |

OTHER PUBLICATIONS

Deke McClelland: "Photoshop 6 for Windows Bible," 2001, IDG Books Worldwide, Inc., Foster City, CA 94404 XP002289633.

* cited by examiner

*Primary Examiner* — David K Moore
*Assistant Examiner* — Quang N Vo
(74) *Attorney, Agent, or Firm* — Michael A. Glenn; Glenn Patent Group

(57) ABSTRACT

Methods and apparatus are provided for dynamically halftoning image data, substantially in real-time. Halftone threshold values are calculated and stored in memory, and halftone output values are calculated for the portions of the image data that will be displayed on a display device. Halftone screen parameters may be modified, and new halftone screen threshold values may be calculated for any affected halftone screens. For unaffected halftone screens, the previously stored threshold values may be retrieved from memory. In addition, the portion of the image to be displayed may be modified, and the halftone output values of the new portion may be calculated and then displayed.

12 Claims, 9 Drawing Sheets

METHODS AND APPARATUS FOR DYNAMICALLY SOFT PROOFING HALFTONE IMAGES

FIELD OF THE INVENTION

This invention relates to image processing, and particularly relates to methods and apparatus for dynamically soft proofing halftone images.

BACKGROUND OF THE INVENTION

Print output devices, such as copiers, printers, and printing presses, typically operate in a binary mode (i.e., a printer typically either deposits colorant or ink on a substrate or does not deposit colorant or ink on the substrate at a specific location). As a result, most print output devices are unable to directly reproduce the variety of intensity levels present in a continuous tone ("contone") image. Instead, halftoning techniques are used to render intensity or lightness levels by converting a contone image to a halftone image. A halftone representation is an approximation of a contone image that uses a series of carefully placed spots of various sizes and/or patterns that, when viewed at a distance, creates an illusion of continuous tones.

Modern printing systems have increasingly incorporated digital image processing technology, in which an image is represented and processed in digital form prior to printing or platesetting. Such image processing techniques include digital halftoning. A common halftoning technique is screening, in which a halftone screen is created that includes a two-dimensional array of threshold values. For color images that have been separated into component colors (e.g., Cyan, Magenta, Yellow and Black), a halftone screen is created for each separation. To create a halftone output, the contone image data values are compared to the halftone screen values on a pixel-by-pixel basis for each color separation.

Holladay U.S. Pat. No. 4,149,194, describes techniques for producing halftone screens with minimum memory requirements. The size of such halftone screens typically are small compared to the image to be printed, and the screens are repeated across the entire image in a manner similar to tiling. If the contone image value for a specific pixel exceeds the corresponding threshold value, a binary "1" is specified at the pixel location. If, however, the contone image value is less than or equal to the corresponding threshold value, a binary "0" value is specified. To produce a printed output from halftone output data, a color spot is printed at the corresponding pixel locations having values of 1, and no spot is printed at corresponding pixel locations having values of 0. This process is repeated for each separation.

A common problem that arises in digital color halftoning is moiré patterns, which are visibly apparent interference patterns that result from interference between two or more halftone screens, between halftone screen dots and portions of the image, and between halftone screen dots and the pixel grid. One commonly known technique for reducing or eliminating moiré patterns involves rotating each halftone screen at a corresponding angle relative to a point of origin. For example, in a three-color process, moiré patterns may be substantially eliminated by using three halftone screens that are square in shape and identical, and placed at 15°, 45° and 75°, respectively, from a point of origin. However, for printing processes that use additional colors, or have non-square-shaped halftone screens, the process of obtaining satisfactory halftone screen values often requires an iterative modification of screen parameters.

Indeed, in traditional printing processes, once a set of screen parameters are specified, halftone threshold values are calculated, the contone data are halftoned, and the resulting output data are sent to a printer to obtain a "hard proof" of the image. In particular, proofs are printed on paper or other print media and inspected to ensure that the images and colors look visually correct. If the resulting proof includes undesirable image artifacts such as moiré, one or more screen parameters can be adjusted and successive hard copy prints can be examined in the hard proofing process. After determining that a particular proof is acceptable, the screen parameters used to make the acceptable proof can be reused to mass-produce, e.g., on a printing press, large quantities of print media that look visually equivalent to the acceptable proof. Such conventional hard proofing techniques are very time and material-intensive and expensive.

"Soft proofing" is an alternative previously known technique that can be used to adjust image processing parameters, such as halftone screen parameters, prior to production printing. In particular, soft proofing is a process that makes use of a display device rather than a printed hard copy. Soft proofing is highly desirable for many reasons. For instance, soft proofing can remove the need to print copies of the image on media during the proofing process. Moreover, soft proofing may allow many people to proof color images from remote locations simply by looking at display devices, rather than awaiting delivery of hard copies. Soft proofing can be faster and more convenient than hard proofing. Moreover, soft proofing can reduce the cost of the proofing process. For these and other reasons, soft proofing is a preferred soft proofing method for modern printing workflows.

Referring to FIG. 1, a previously known soft proofing system is described. Soft proofing system 10 includes memory 12, processor 14 and viewer 16. Memory 12 may be a hard drive, floppy disk, optical disk, or other similar memory device, and may include an image file 18 that includes contone image data separated into Cyan, Magenta, Yellow and Black ("CMYK") colorants. Processor 14 may be a general purpose computer, such as a personal computer or workstation, that may be programmed to determine halftone screen threshold values based on user-input 18, and to apply the threshold values to image file 18 to provide halftoned data suitable for display on viewer 16.

Such previously known soft proofing processes, however, are extremely slow when used to iteratively modify and display halftone image data. For example, if image file 18 includes an 8"×10" image at a resolution of 2400 dots/inch, the file includes more than 460 million pixels for each color separation. As a result, if the user changes screen parameters of any halftone screen, processor 14 typically will recalculate all threshold values for that screen, and then reprocess all image pixels, one pixel at a time, for the corresponding color separation to provide updated halftone data values for display on viewer 16. Such recalculation and processing may take a considerable amount of time, which makes soft proofing system 10 cumbersome and slow for purposes of iteratively determining and displaying halftone screen parameters. As a result, previously known soft proofing systems for halftoning have had limited commercial success.

In view of the foregoing, it would be desirable to provide soft proofing methods and apparatus that reduce the time required to display halftone image data.

It also would be desirable to provide soft proofing methods and apparatus that allow halftone image data to be quickly modified and displayed.

It further would be desirable to provide soft proofing methods and apparatus that allow halftone screening substantially in real-time.

It additionally would be desirable to provide soft proofing methods and apparatus that allow automatic detection and elimination of moiré.

It also would be desirable to provide soft proofing methods and apparatus that show realistic dot gain through simulated dot growth

SUMMARY OF THE INVENTION

In view of the foregoing, it is an object of this invention to provide soft proofing methods and apparatus that reduce the time required to display halftone image data.

It also is an object of this invention to provide soft proofing methods and apparatus that allow halftone image data to be quickly modified and displayed.

It further is an object of this invention to provide soft proofing methods and apparatus that allow halftone screening substantially in real-time.

It additionally is an object of this invention to provide soft proofing methods and apparatus that allow automatic detection and elimination of moiré.

It also is an object of this invention to provide soft proofing methods and apparatus that show realistic dot gain through simulated dot growth.

These and other objects of this invention are accomplished by providing methods and apparatus that softproof halftone image data substantially in real-time. In particular, halftone threshold values are calculated and stored in memory for quick retrieval and reuse. Using the threshold values, halftone output values are calculated for the portions of the image data that will be displayed on a display device. The calculated halftone output values also may be stored in memory for quick retrieval and reuse. Halftone screen parameters may be modified, and new halftone screen threshold values may be calculated for any affected halftone screens. For unaffected halftone screens, the previously stored threshold values may be retrieved from memory. In addition, the portion of the image to be displayed may be modified, and the halftone output values of the new portion may be calculated and then displayed. Such efficient processing techniques allow halftone screening, halftone parameter modification and moiré detection substantially in real time.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION OF THE INVENTION

Figure 1:
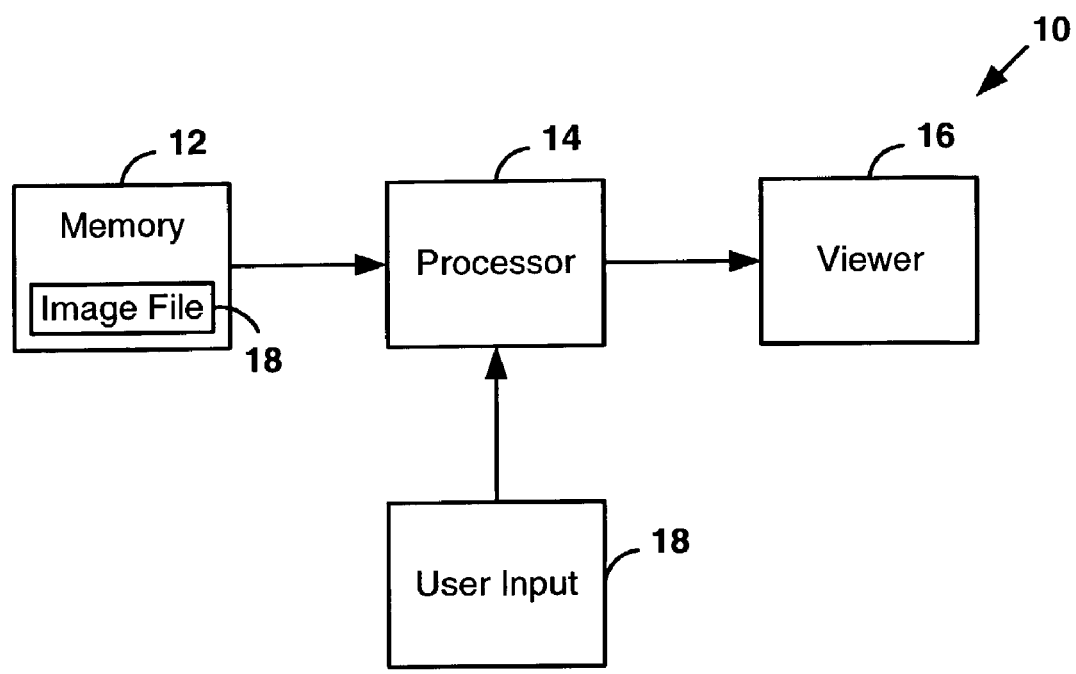
FIG. 1 is a block diagram of a previously known soft proofing system.
Figure 2:
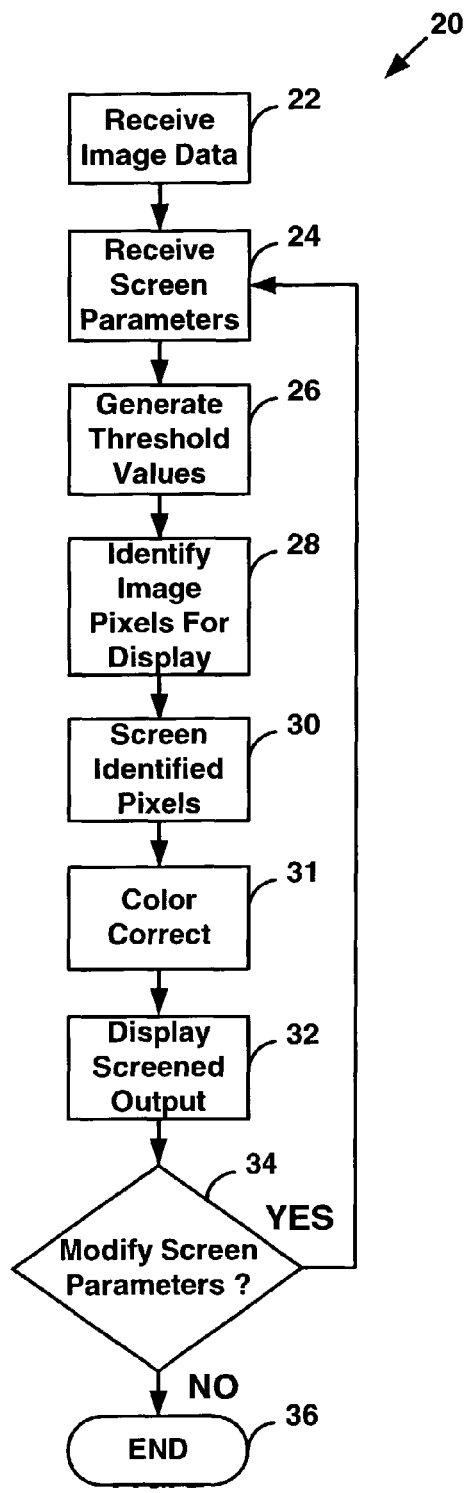
FIG. 2 is a block diagram of an exemplary process in accordance with this invention.

Referring to FIG. 2, an exemplary embodiment of soft proofing processes in accordance with this invention is described. Exemplary soft proofing process 20 begins at step 22, in which contone image data are received. The contone image data may be provided as any suitable source of contone data. For example, image data may be converted from a page description language to a contone bitmap. For color images, the contone image data preferably are separated into individual color components, such as CMYK color components. For printing systems that use "spot colors" to extend the gamut of colors that may be printed, such as printing systems that use Pantone, Toyo DIC, HKS, or similar spot colors, the contone image data preferably are separated into CMYK plus spot color components. The separated contone data may be stored in memory, such as a hard disk, floppy disk, optical disk, read only memory ("ROM"), random access memory ("RAM"), or any similar memory device.

At step 24, screen parameters, such as screen angle, size, resolution, frequency, spot function, and other similar screen parameters are received for each halftone screen used to convert contone data to halftone data. For each color channel, a corresponding halftone screen and corresponding set of screen parameters exists. Thus, a CMYK+spot color print process includes one halftone screen for each of the C channel, M channel, Y channel, K channel, and each spot color, with each halftone screen having its own set of parameters.

Figure 3:
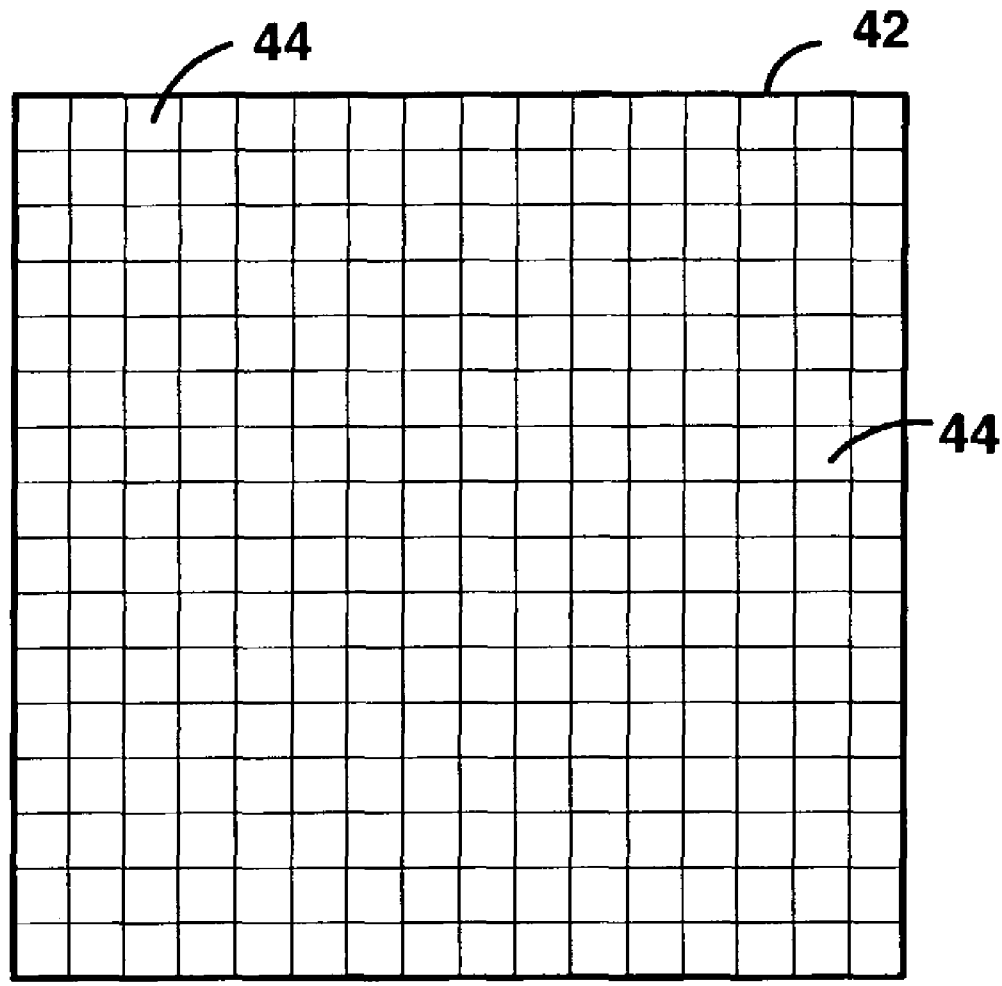
FIG. 3 is a diagram of an exemplary halftone screen that may be used with methods and apparatus in accordance with this invention.

At step 26, threshold values for each halftone screen are calculated based on the parameters received at step 24. Any conventional technique for generating halftone threshold values may be used. For example, the threshold values may be created by using a spot function, which is a mathematical description of the shape of a halftone screen and the turn-on sequence for cells that comprise the halftone screen. Once the threshold values have been created, they may be stored in a memory device, such as a hard disk, floppy disk, optical disk, ROM, RAM, or similar memory device. In particular, the threshold values may be stored in a "threshold cache" area of memory for subsequent quick retrieval. An exemplary halftone screen for a single channel (e.g., Y) is shown in FIG. 3. Halftone screen 42 includes a 16×16 array of cells 44, with each cell being equal to the smallest size image or "dot" producible on the print device that will be used to print the image. Although not shown in FIG. 3, each halftone cell has a corresponding threshold value.

Figure 4:
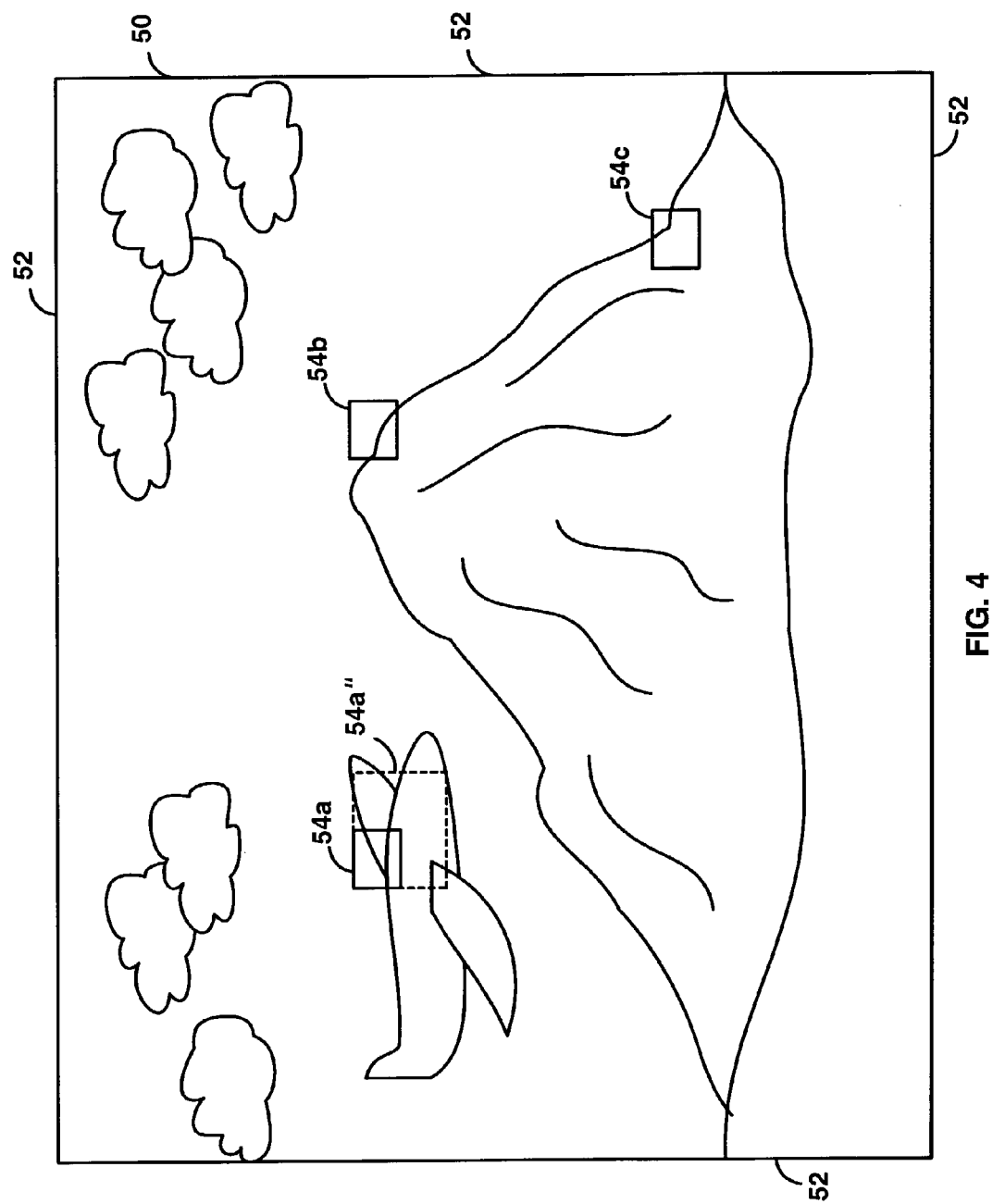
FIG. 4 is a diagram of an exemplary contone image that may be processed in accordance with methods and apparatus of this invention.

Referring again to FIG. 2, at step 28, the halftone image pixels that will be displayed on a display device, such as a cathode ray tube or liquid crystal display color monitor, are identified. Referring to FIG. 4, an exemplary illustration of a full-scale contone image is described. An 8×10 inch contone image 50, having peripheral edges 52, and having a resolution of 2,400 dots per inch ("dpi") includes 24,000×19,200 pixels. The resolution of a conventional color monitor, in contrast, is 1,280×1,024 pixels. Thus, at a 1:1 resolution, the monitor displays a portion 54 of image 50 that is approximately $1/19^{th}$ the width and approximately $1/19^{th}$ the length of the image.

Figure 5A:
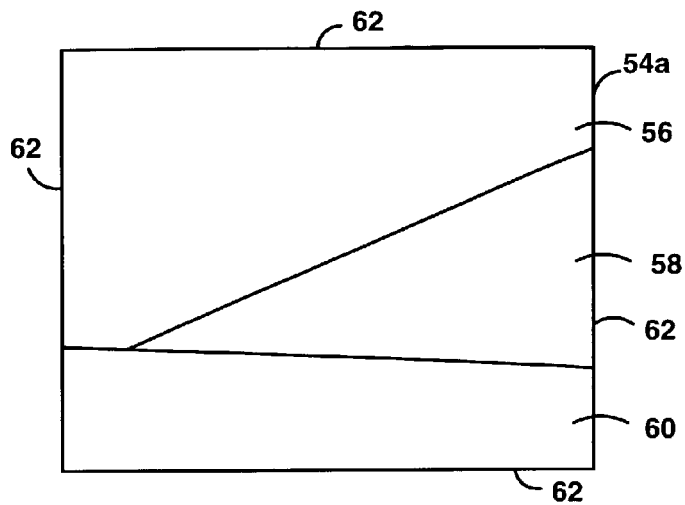
FIG. 5A is a diagram of an exemplary portion of the contone image of FIG. 4.
Figure 5B:
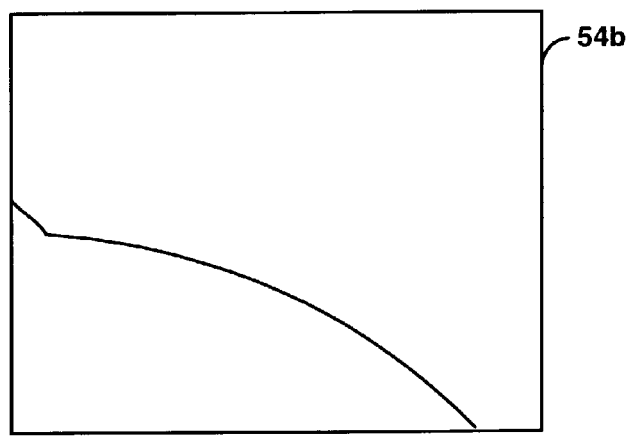
FIG. 5B is a diagram of another exemplary portion of the contone image of FIG. 4.
Figure 5C:
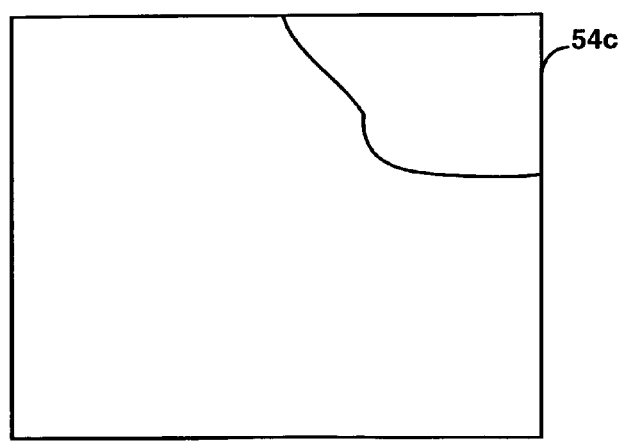
FIG. 5C is a diagram of another exemplary portion of the contone image of FIG. 4.

Portion 54 may be identified based on user input. For example, a user may specify portion 54 via a user interface such as a keyboard, mouse, pointing device, or any other way for identifying a portion of image 50. Three such exemplary portions 54a, 54b and 54c are shown in expanded detail in FIGS. 5A-5C. For simplicity, unless otherwise stated, the following discussion will refer to portion 54a of image 50. As shown in FIG. 5A, portion 54a includes first, second and third areas 56, 58 and 60, respectively and has edges 62. As discussed in more detail below, for one color channel (e.g., Y), area 56 includes image pixels having a first intensity (e.g., 0%), area 58 includes image pixels having a second intensity (e.g., 33%), and area 60 includes image pixels having a third intensity (e.g., 60%).

Referring again to FIG. 2, at step 30, the separated color data are screened using the threshold values generated in step 26. In particular, the color data for portion 54a identified in step 28 are screened. Because only portion 54a will be displayed, it is unnecessary to screen the entire image 50. As a result, the time required to generate halftone output data are significantly reduced compared to prior art techniques.

For each color separation, the halftone output data for that color are calculated by comparing the corresponding screen threshold values to the color data on a pixel-by-pixel basis. If the color data for a specific pixel exceeds the corresponding threshold value, the halftone output for that pixel is a binary "1." If, however, the color data are less than or equal to the corresponding threshold value, the halftone output for that pixel is a binary "0." The halftone output data may be stored in a memory device, such as a hard disk, floppy disk, optical disk, ROM, RAM, or similar memory device. The halftone output data may be stored on the same memory device used to store the threshold values, or may be stored on a different memory device. Further, the halftone output data may be stored in a "halftone cache" area of memory for subsequent quick retrieval.

Figure 6:
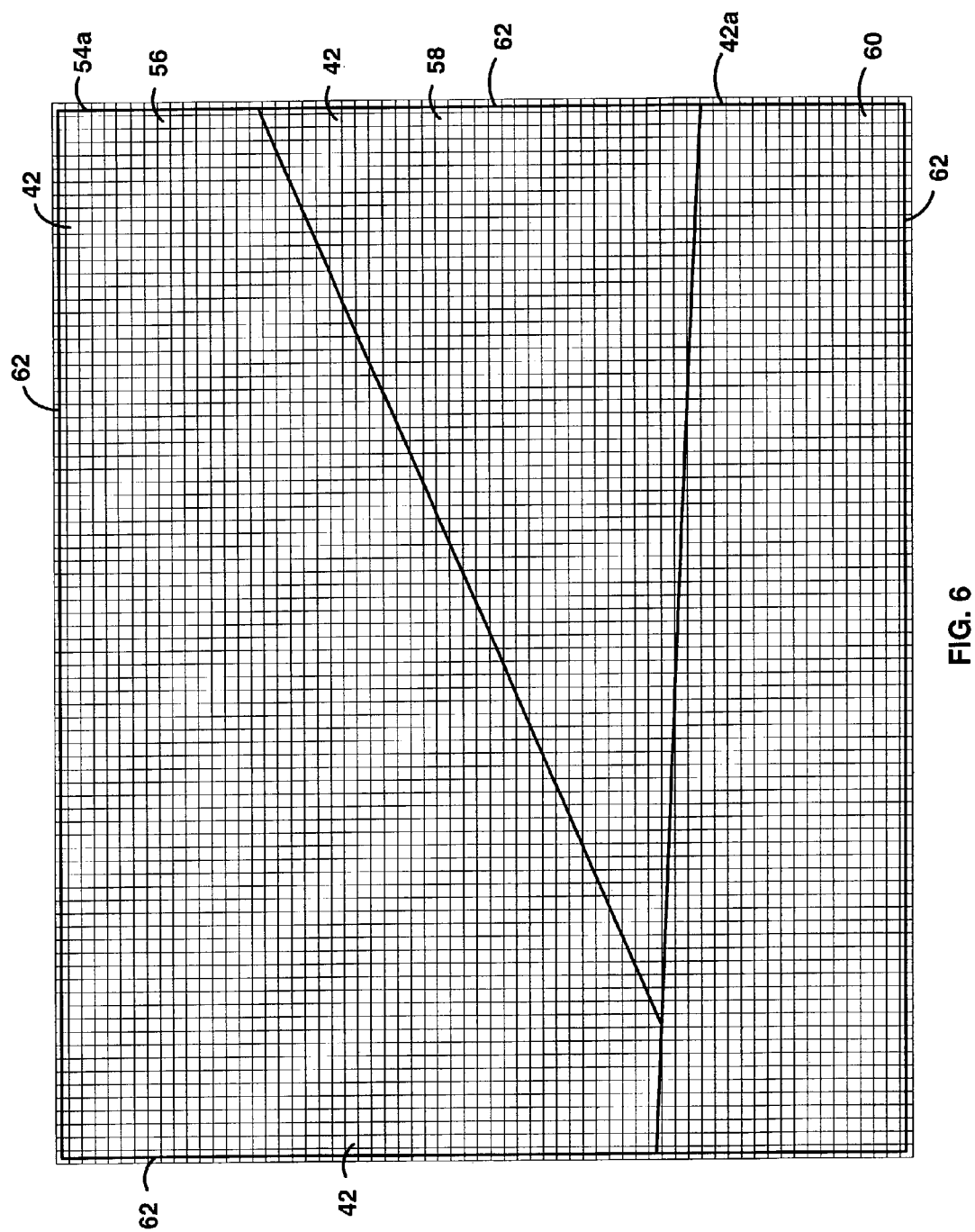
FIG. 6 is a diagram of the portion of FIG. 5A overlaid with the exemplary halftone screen of FIG. 3.

FIG. 6 shows exemplary portion 54a, overlaid with halftone screens 42. As described above, each color channel has a corresponding halftone screen. For simplicity, FIG. 6 shows an array of halftone screens 42 for a single color channel. In general, halftone screens 42 may be aligned relative to peripheral edges 52 of image 50 (FIG. 4). Thus, depending on the location of portion 54a within image 50, edges 62 of portion 54a may not align with edges of halftone screen 42. This is illustrated in FIG. 6, in which halftone screen 42a extends beyond right edge 62. As described above, only the color image data from portion 54a are screened. Thus, the time required to generate the halftone output data for portion 54a is significantly reduced.

Referring again to FIG. 2, at step 31, the screened CMYK and spot color data are color corrected for display in red, green, blue ("RGB") color space. The color correction may be any conventional color correction for converting CMYK and spot color data to RGB data. Additionally, spot colors may be corrected in a CIEXYZ color space.

Figure 7:
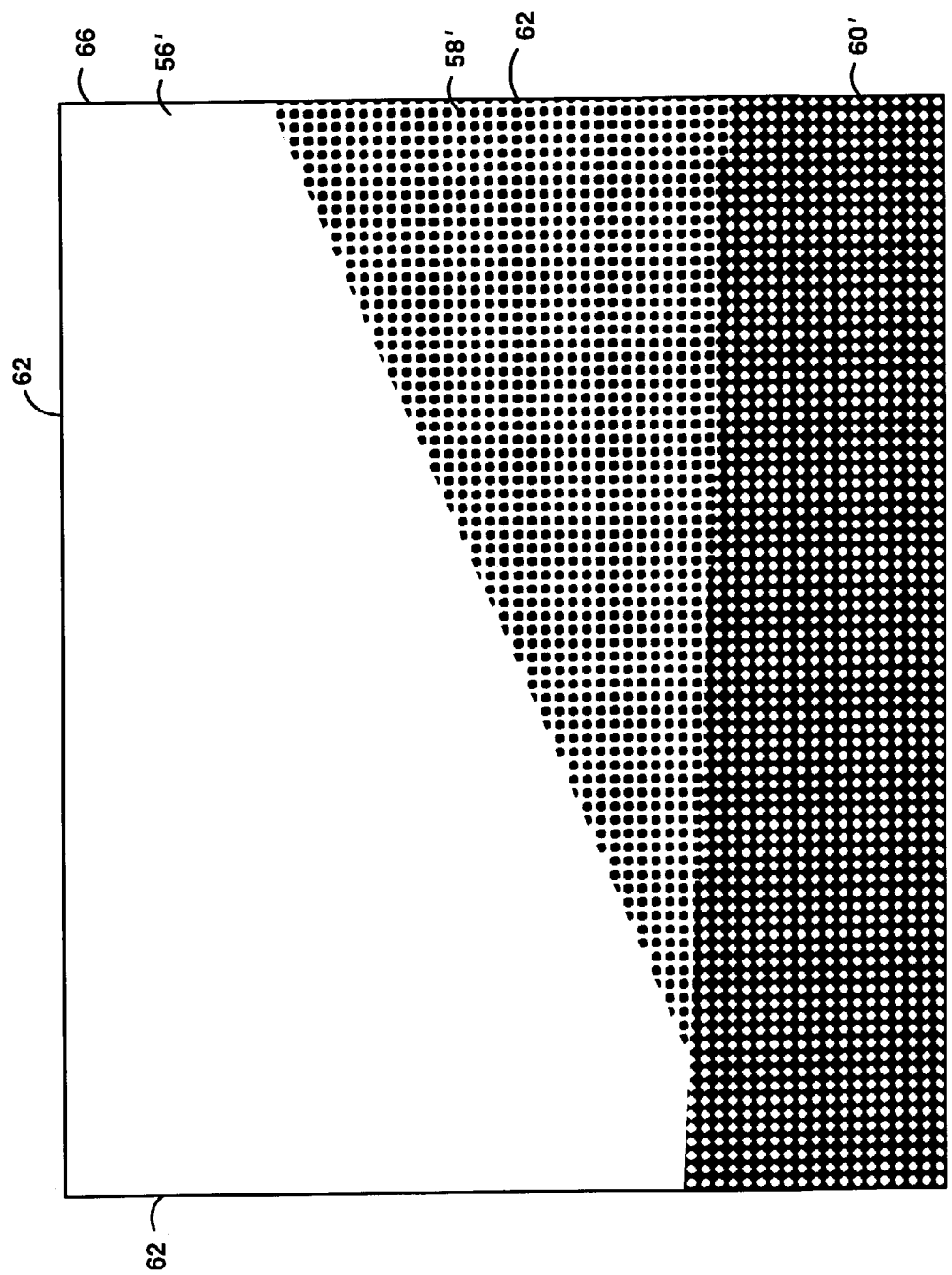
FIG. 7 is a diagram of exemplary halftone output data in accordance with methods and apparatus of this invention.

Referring again to FIG. 2, at step 32, the screened output data for portion 54a are displayed on a display device. FIG. 7 illustrates an exemplary display of halftone output data for a single color channel (e.g., Y) corresponding to portion 54a. In particular, displayed image 66 includes area 56', which includes exemplary halftone spots corresponding to the first intensity (i.e., 0%), area 58' includes exemplary halftone spots corresponding to the second intensity (i.e., 33%), and area 60' includes exemplary halftone spots corresponding to the third intensity (i.e., 60%). Although not shown in FIG. 7, displayed image 66 also may include halftone output data from one or more of the other color channels (e.g., C, M, K and any spot colors). Persons of ordinary skill in the art also will understand that the displayed halftone output data may be conveniently rotated by 90 degree increments so that the image appears properly oriented to the user.

Referring again to FIG. 2, at step 34, a decision is made whether any of the screen parameters should be modified. For example, the displayed image 66 may indicate that the previously selected screen parameters result in an unacceptable moiré pattern. As a result, any of the screen angle, size, resolution, frequency, spot function, or similar screen parameter may be changed. If the decision at step 34 is NO, the process ends at step 36. If, however, the decision at step 34 is YES, the process returns to step 24, wherein modified screen parameters are received.

Based on the modified parameters, the threshold cache and halftone cache may be selectively cleared. For example, if the screen parameters of only one channel are modified, the threshold cache and halftone cache data associated with that color channel may be cleared, and the remaining data may be retained and reused in subsequent steps, thereby reducing processing time. Thus, at step 26, threshold values are generated only for the halftone screens 42 whose parameters have been changed. Similarly, at step 30, the separated color data are screened only for the channels whose halftone screen values have been modified. For the other color channels, the data previously stored in halftone cache are retrieved. At step 32, the halftone output data are displayed. The screen parameters may again be changed and the process repeated until a desired set of screen parameters are obtained. Because the screening process is fast, a user may quickly determine— substantially in real-time—the screen parameters that optimally may be used to produce a hardcopy output of image 50. Once the desired set of screen parameters have been obtained, the contone data for the entire image optionally may be screened, and the halftone output data for the entire image may be saved to memory.

Figure 8:
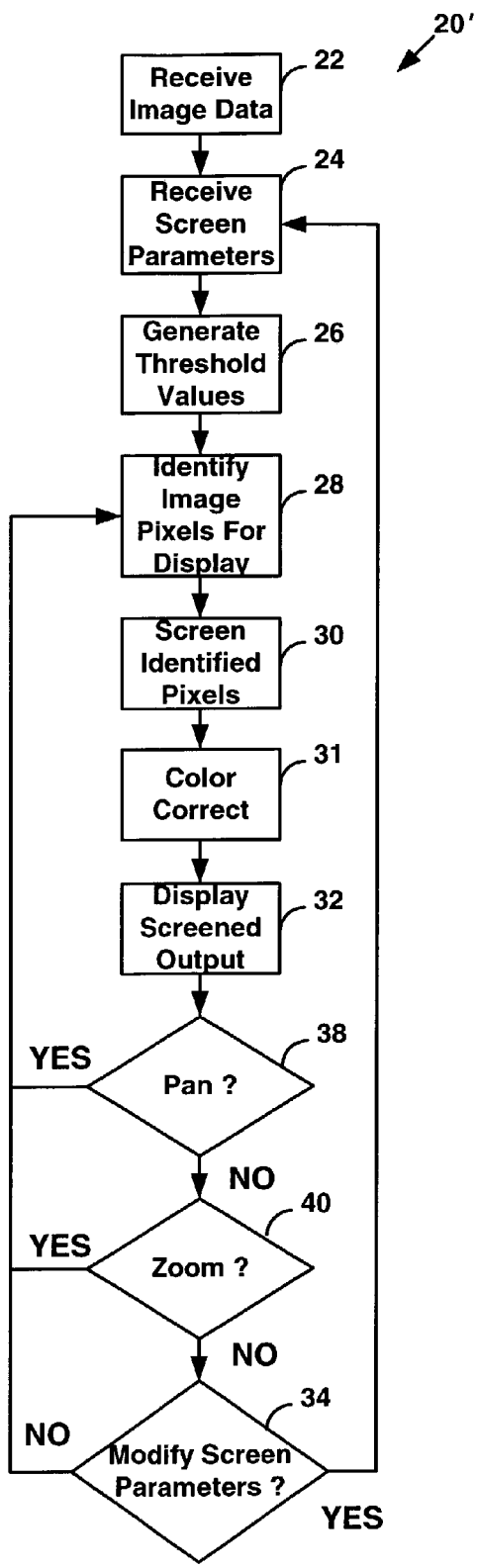
FIG. 8 is a block diagram of an alternative exemplary process in accordance with this invention.
Figure 9:
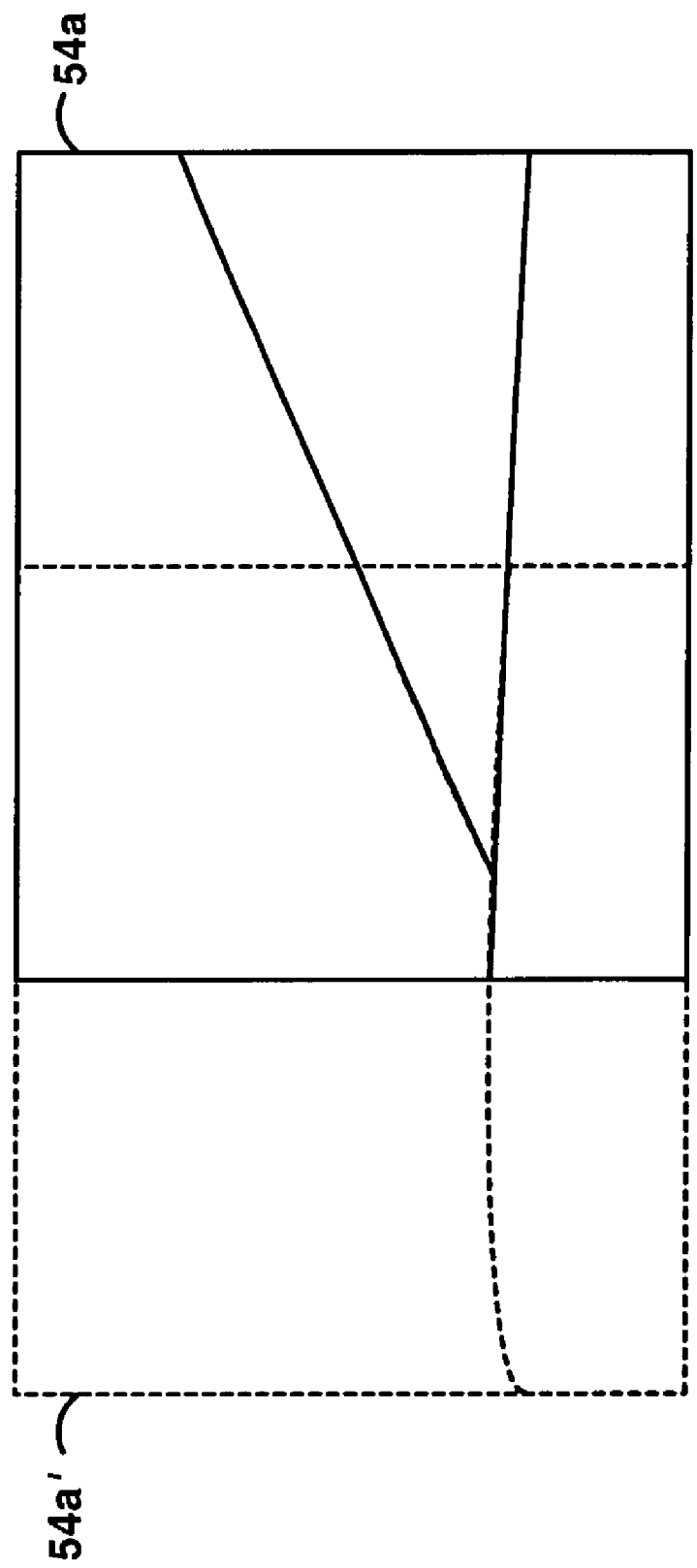
FIG. 9 is a diagram of two exemplary overlapping portions of the contone image of FIG. 4.

Referring now to FIG. 8, an alternative exemplary embodiment of soft proofing process in accordance with this invention is described. Soft proofing process 20' includes steps 22-34 as described above with respect to FIG. 2. In addition, however, after halftone output data are displayed at step 32, a decision is made at step 38 whether to pan the display to another portion 54' of image 50. If the decision is YES, the process returns to step 28 where the halftone image pixels that will be displayed on the display device are identified based on user-specified input. For example, a user may specify a new portion 54' by scrolling across image 50 using a mouse, keyboard, scroll bar, thumbwheel, joystick, or other similar device. An exemplary new portion 54a' of image 50 is shown in FIG. 9. The peripheral edge of portion 54a' is shown in dashed line, and is located one-half a display screen to the left of portion 54a.

Because the screen parameters have not been modified, the threshold values need not be recalculated, and may be retrieved from threshold cache. Thus, the separated color data for new portion 54a' identified in step 28 are screened using the halftone screens generated in step 26. Once again, the color image data from portion 54a' are screened, thereby significantly reducing the time required to generate the halftone output data. In addition, as described above, a portion of the halftone output data may be retrieved from halftone cache. Thus, for portion 54a', the previously stored halftone data corresponding to left half of portion 54a may be retrieved from memory, thereby eliminating the need to re-screen that same data.

Referring again to FIG. 8, if the decision at step 38 is NO, the process proceeds to step 40, at which a decision is made whether to reduce or enlarge the data displayed on the display device. If the decision at step 40 is NO, the process proceeds to step 34, wherein a decision is made whether to modify the screen parameters. If the decision at step 40 is YES, however, the process returns to step 28 where the halftone image pixels that will be displayed on the display device are identified based on user-specified input.

For example, a user may specify a new portion 54a'' by selecting a "zoom" function to reduce or expand the displayed image using a mouse, keyboard, scroll bar, thumbwheel, joystick, or other similar device. To expand an image (i.e., to zoom "in" on the image), halftone output data may be retrieved from the halftone cache, and interpolation techniques, such as bilinear interpolation or any other similar interpolation techniques, may be used to up-sample the data.

To contract an image (i.e., to zoom "out" on the image), the halftone image pixels that will be displayed on a display device are identified (e.g., portion 54*a*" in FIG. 4), the identified data are screened, and then the screened output data are down-sampled with interpolated averaging. To preserve color accuracy, the averaging preferably should be performed in the CIEXYZ color space, or its equivalent. Otherwise, artificial moiré may be introduced in the displayed image, or moiré that actually exists in the halftoned image may not be accurately displayed. Following averaging, the halftone output data are displayed on the display device, as described above.

Persons of ordinary skill in the art will understand that the sequence of steps described above may be changed without departing from the scope and spirit of this invention. For example, the halftone image pixels that will be displayed may be identified before the screen parameters are received and the threshold values are calculated. In addition, the decision to pan or zoom the image may be made before deciding whether to modify the screen parameters.

Persons of ordinary skill in the art will understand that methods in accordance with this invention may be implemented by a software application or other similar computer program running on a general purpose computer, personal computer, laptop, handheld computer, workstation, or other similar computing device. Persons of ordinary skill in the art also will understand that methods in accordance with this invention may be implemented on a computing device as part of an automated image processing application. For example, an image processing application may be programmed to automatically detect moiré (e.g., by Fourier analysis or other similar methods that detect low-frequency patterns of intensity), display an indication that moiré has been detected (e.g., using red, yellow and green color indicators or a vernier scale to convey the severity of moiré detected) and use methods in accordance with this invention to automatically select the screen parameters to eliminate or reduce moiré.

Persons of ordinary skill in the art further will understand that any form of screening may be dynamically calculated and viewed, and that some of the steps described above may be unnecessary. For example, some screening methods may not generate threshold arrays (e.g., error diffusion dithering) so that generation and application of the screen is performed in one step. Other screening methods may have very slow generation of threshold arrays (e.g., stochastic screening), so that it may be appropriate to precompute threshold values using screen parameters that have a high probability of being selected.

The foregoing merely illustrates the principles of this invention, and various modifications can be made by persons of ordinary skill in the art without departing from the scope and spirit of this invention.

We claim:

1. A computer-implemented method for soft proofing image data comprising a plurality of pixels, the method comprising:
   receiving, with a computer, a halftone screen parameter;
   calculating, with the computer, a plurality of halftone screen threshold values based on the halftone screen parameter;
   identifying, with the computer, a subset of the pixels in an image for display;
   simulating dot gain of said subset of the pixels resulting in identified, simulated pixels;
   automatically detecting the presence of a moiré pattern in said identified simulated pixels using Fourier analysis;
   generating, with the computer, halftone output data by screening only the identified, simulated pixels with the calculated threshold values;
   storing, with the computer, the halftone output data in a cache;
   displaying, with the computer, the halftone output data on a display device in real-time;
   modifying, with the computer, a halftone screen parameter upon the detection of a moiré pattern;
   clearing the cache of the halftone output data associated with the pixels affected by the modified halftone screen parameter;
   calculating, with the computer, updated halftone screen threshold values associated with pixels affected by the modified screen parameter;
   calculating, with the computer, updated halftone output data only for the identified, simulated pixels affected by the updated halftone screen threshold values;
   displaying, with the computer, the updated halftone output data for the identified pixels affected by the modified screen parameter;
   displaying, with the computer, the cached halftone output data for the identified, simulated pixels not affected by the modified screen parameter; and
   responsive to a completion of modifying, with the computer, the halftone screen parameter, generating halftone output data for the entire image.

2. The method of claim 1, wherein the image data comprises contone image data.

3. The method of claim 1, wherein the image data comprises CMYK color data.

4. The method of claim 1, wherein the image data comprises spot color data.

5. The method of claim 1, wherein the halftone screen parameter comprises screen angle.

6. The method of claim 1, wherein the halftone screen parameter comprises screen size.

7. The method of claim 1, wherein the halftone screen parameter comprises screen resolution.

8. The method of claim 1, wherein the halftone screen parameter comprises screen frequency.

9. The method of claim 1, wherein the halftone screen parameter comprises screen spot function.

10. The method of claim 1, wherein:
    the receiving step further comprises receiving, with the computer, a plurality of halftone screen parameters, each associated with a corresponding halftone screen; and
    the calculating step further comprises calculating, with the computer, a plurality of halftone screen threshold values for each of the halftone screens based on the associated screen parameter.

11. The method of claim 1, wherein the pixels affected by the halftone screen parameter change are members of a subset of color separations comprising the output data.

12. The method of claim 1, wherein pixels affected by the halftone screen parameter change are members of one of the color separations comprising the output data.

* * * * *